(12) United States Patent
Yamada et al.

(10) Patent No.: US 10,996,510 B2
(45) Date of Patent: May 4, 2021

(54) PLANAR LIGHTING DEVICE AND LIQUID CRYSTAL DISPLAY DEVICE

(71) Applicant: FUJIFILM Corporation, Tokyo (JP)

(72) Inventors: Naoyoshi Yamada, Kanagawa (JP); Yukito Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/856,618

(22) Filed: Apr. 23, 2020

(65) Prior Publication Data

US 2020/0249529 A1 Aug. 6, 2020

Related U.S. Application Data

(63) Continuation of application No. PCT/JP2018/039243, filed on Oct. 22, 2018.

(30) Foreign Application Priority Data

Oct. 25, 2017 (JP) .............................. JP2017-206038

(51) Int. Cl.
*G02F 1/1335* (2006.01)
*G02F 1/13357* (2006.01)

(52) U.S. Cl.
CPC .. *G02F 1/133606* (2013.01); *G02F 1/133603* (2013.01); *G02F 1/133611* (2013.01); *G02F 1/133613* (2021.01)

(58) Field of Classification Search
CPC ......... G02F 1/133606; G02F 1/133607; G02F 1/133602; G02F 1/133603;
(Continued)

(56) References Cited

U.S. PATENT DOCUMENTS

| 2006/0291238 A1 | 12/2006 | Epstein et al. |
| 2007/0159843 A1* | 7/2007 | Choi ................. G02F 1/133603 362/561 |
| 2011/0317096 A1 | 12/2011 | Yokota et al. |

FOREIGN PATENT DOCUMENTS

| JP | 2008-547173 A | 12/2008 |
| JP | 2010-277986 A | 12/2010 |

OTHER PUBLICATIONS

International Preliminary Report on Patentability and Written Opinion of the International Searching Authority with an English translation, dated May 7, 2020, for International Application No. PCT/JP2018/039243.

(Continued)

*Primary Examiner* — Thoi V Duong
(74) *Attorney, Agent, or Firm* — Birch, Stewart, Kolasch & Birch, LLP

(57) ABSTRACT

The planar lighting device includes: a light source; and a brightness homogenizing member that has a laminate structure including high refractive index layers and low refractive index layers, and a light incidence portion that allows light emitted from each of the plurality of point light sources to be incident into the high refractive index layers is provided at a position of the laminate structure facing the point light source. The light incidence portion is formed of a hollow portion that is provided across the two or more high refractive index layers included in the laminate structure to penetrate at least one high refractive index layer and has a function of allowing the light to be incident into the high refractive index layers, and each of the high refractive index layers includes a light extraction mechanism that is provided at a position spaced apart from the light incidence portion.

9 Claims, 5 Drawing Sheets

(58) Field of Classification Search
CPC ......... G02F 1/133504; G02F 1/133553; G02F 1/133507; G02F 1/133611; G02F 1/133613; G02F 1/133615; G02F 1/1336; G02F 2203/023; F21S 2/00
See application file for complete search history.

(56) References Cited

OTHER PUBLICATIONS

International Search Report, dated Dec. 11, 2018, for international Application No. PCT/JP2018/039243, with an English translation.

* cited by examiner

PLANAR LIGHTING DEVICE AND LIQUID CRYSTAL DISPLAY DEVICE

CROSS-REFERENCE TO RELATED APPLICATIONS

This application is a continuation application of International Application No. PCT/JP2018/039243, filed Oct. 22, 2018, the disclosure of which is incorporated herein by reference in its entirety. Further, this application claims priority from Japanese Patent Application No. 2017-206038, filed Oct. 25, 2017, the disclosure of which is incorporated herein by reference in its entirety.

BACKGROUND OF THE INVENTION

1. Field of the Invention

The present disclosure relates to a planar lighting device and a liquid crystal display device including the planar lighting device.

2. Description of the Related Art

A liquid crystal display device (LCD) has been more widely used as a space-saving image display device having low power consumption. For example, the liquid crystal display device has a configuration in which a backlight unit, a backlight-side polarizing plate, a liquid crystal panel, a visible-side polarizing plate, and the like are provided in this order.

As the backlight unit, for example, an edge light mode (also referred to as "side light mode") and a direct backlight mode are known, the edge light mode including a light guide plate and a light source that is arranged on an edge surface of the light guide plate, in which light incident from the light source into the edge surface is guided and emitted from the entire main surface to a liquid crystal panel, and the direct backlight mode having a structure in which a light source is arranged immediately below a liquid crystal panel without using a light guide plate and light is emitted to a liquid crystal panel from the entire main surface of a light diffusion plate provided on the light source.

In order to improve the image quality of a LCD, a backlight unit capable of local dimming is required. As the edge light mode backlight unit, a backlight unit having a configuration in which a plurality of light guide plates are arranged to realize dimming is disclosed. The thickness of this backlight unit can be made to be 1 mm or less. On the other hand, the edge light mode backlight unit has a problem in that the division number cannot increase. On the other hand, in a direct backlight unit in the related art, by using a plurality of point light sources as a light source, dimming of several hundreds of divided areas can be performed.

However, the thickness of the direct backlight unit in the related art is not likely to be reduced and is 15 mm or more. A light diffusion plate provided in a direct backlight unit is arranged in order to diffuse light emitted from a light source such that brightness unevenness of emitted light in a plane (inhomogeneity of in-plane brightness) is reduced. Recently, along with demands for reduction in power and size, a light emitting diode (LED) light source has been mainly used. This LED light source has strong directivity. Therefore, in the case of a direct backlight mode, a region immediately above a LED becomes very bright, which causes significant brightness unevenness. The reason why it is difficult to reduce the thickness of a direct backlight unit is that, in order to obtain irradiation light having a small brightness unevenness in the entire light emission surface, a light diffusion plate and a LED light source needs to be sufficiently spaced from each other with a sufficient distance.

P2010-277986A (hereinafter, referred to as "PTL 1") discloses a technique in which a plurality of light guide layers are provided on a LED light source and an uneven portion is provided to an interface between the light guide layers such that light emitted from the light source is reflected from the uneven portion to be incident into the light guide layer. As a result, even a direct backlight unit can be made thin and realize brightness homogenization.

SUMMARY OF THE INVENTION

However, according to an investigation by the present inventors, it was found that, with the technique of PTL 1, it is difficult to allow a sufficient amount of light emitted from the light source to be incident into each of the light guide layers with high efficiency, and suppression of brightness unevenness and improvement of light use efficiency cannot be sufficiently realized.

The present disclosure has been made under the above-described circumstances, and an object thereof is to provide a planar lighting device that has a thin shape and can emit homogeneous illumination light with a small brightness unevenness, and a liquid crystal display device including the planar lighting device.

According to the present disclosure, there is provided a planar lighting device comprising:

a light source portion including a plurality of point light sources that are two-dimensionally arranged; and a brightness homogenizing member that homogenizes a brightness of light emitted from the light source portion and emits light having homogeneous brightness, the brightness homogenizing member including an incidence surface at which light from the light source portion is incident and an emission surface at an opposite side of the brightness homogenizing member from the incidence surface, that emits light, in which the brightness homogenizing member has a laminate structure in which high refractive index layers having a relatively high refractive index and low refractive index layers having a relatively low refractive index are alternately laminated in a direction perpendicular to the emission surface and the number of the high refractive index layers is two or more, a light incidence portion, which allows light emitted from each of the plurality of point light sources to be incident at the high refractive index layers included in the laminate structure, is provided at a position in the laminate structure facing the point light sources, the light being incident into the high refractive index layers under a condition such that the light is guided by total reflection in the high refractive index layers, the light incidence portion is formed of a hollow portion that is provided across the two or more high refractive index layers included in the laminate structure to penetrate at least one high refractive index layer and has a function of allowing the light to be incident at the high refractive index layers by refraction or reflection from a side wall surface of the hollow portion, and each of the high refractive index layers includes a light extraction mechanism that is provided at a position spaced apart from the light incidence portion to allow the light guided in the high refractive index layers to be emitted to the emission surface side.

"The high refractive index layer having a relatively high refractive index" and "the low refractive index layer having a relatively low refractive index" represent that the high refractive index layer has a higher refractive index than the low refractive index layer.

In the planar lighting device according to the present disclosure, the hollow portion may have a wide opening at an emission surface side thereof and may have a shape in which a diameter decreases toward the point light source facing the hollow portion.

In the planar lighting device according to the present disclosure, the hollow portion may have a conical shape having an opening at an incidence surface side thereof at a position facing the point light source.

In the planar lighting device according to the present disclosure, the hollow portion may have a cylindrical shape having an opening that faces the point light source facing the hollow portion.

In the planar lighting device according to the present disclosure may further comprises a light reflection member or a light absorption member that is provided at a position of the laminate structure facing the point light source with the hollow portion interposed between the laminate structure and the point light source.

In the planar lighting device according to the present disclosure, it is preferable that a distance of the light extraction mechanism included in each of the high refractive index layers from the light incidence portion increases toward the high refractive index layer closest to the incidence surface side.

In the planar lighting device according to the present disclosure, the light extraction mechanism may be provided in an annular shape centering on the light incidence portion.

In the planar lighting device according to the present disclosure, it is preferable that the low refractive index layer is an air layer.

According to the present disclosure, there is provided a liquid crystal display device comprising: a liquid crystal display element; and the planar lighting device according to the present disclosure.

The planar lighting device according to the present disclosure includes the brightness homogenizing member having the above-described configuration. Therefore, a thin shape can be realized, and homogeneous illumination light with a small brightness unevenness can be emitted.

DESCRIPTION OF THE PREFERRED EMBODIMENTS

Figure 1:
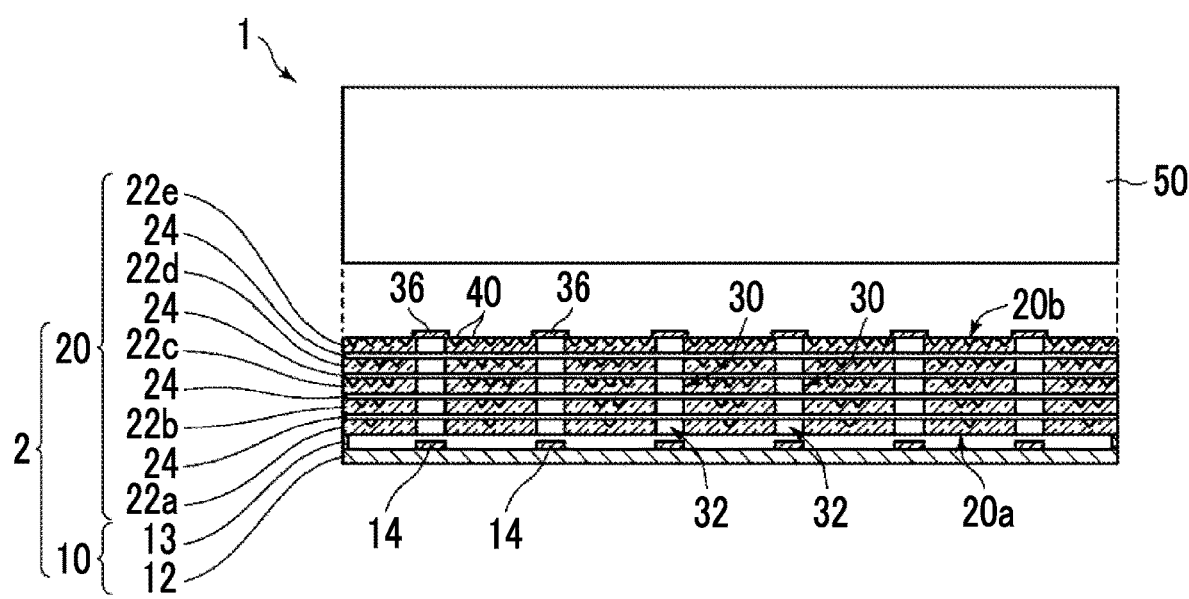
FIG. 1 is a schematic cross-sectional view illustrating a schematic configuration of a liquid crystal display device according to one embodiment of the present invention.

Hereinafter, an embodiment of the present invention will be described using the drawings, but the present invention is not limited thereto. For easy visual recognition, the reduced scale or the like of respective components in the drawing is different from the actual scale. In addition, in present specification, unless specified otherwise, numerical ranges represented by "to" include numerical values before and after "to" as lower limit values and upper limit values.

FIG. 1 is a cross-sectional view illustrating a schematic configuration of a liquid crystal display device 1 according to one embodiment of the present invention.

The liquid crystal display device 1 includes: a liquid crystal display element 50 into which light is incident from a backlight incidence surface opposite to an image display surface; and a backlight unit 2 that is arranged on the backlight incidence surface side of the liquid crystal display element 50. The backlight unit 2 is an embodiment of the planar lighting device according to the present invention.

The backlight unit 2 includes: a light source portion 10 including a plurality of point light sources 14 that are two-dimensionally arranged; and a brightness homogenizing member 20 that homogenizes a brightness of light emitted from the light source portion 10 and emits the light having the homogeneous brightness, the brightness homogenizing member including an incidence surface 20a at which light from the light source portion 10 is incident and an emission surface 20b at an opposite side of the brightness homogenizing member from the incidence surface 20a, that emits light. In addition, the backlight unit 2 may include a prism sheet, a diffusion sheet, a phosphor sheet, and a brightness enhancement sheet (all of which are not illustrated) between the brightness homogenizing member 20 and the liquid crystal display element 50.

The liquid crystal display element 50 includes a liquid crystal panel, a visible-side polarizing plate that is provided on a visible side on the liquid crystal panel, and a backlight-side polarizing plate that is provided on a backlight side of the liquid crystal panel.

Figure 2:
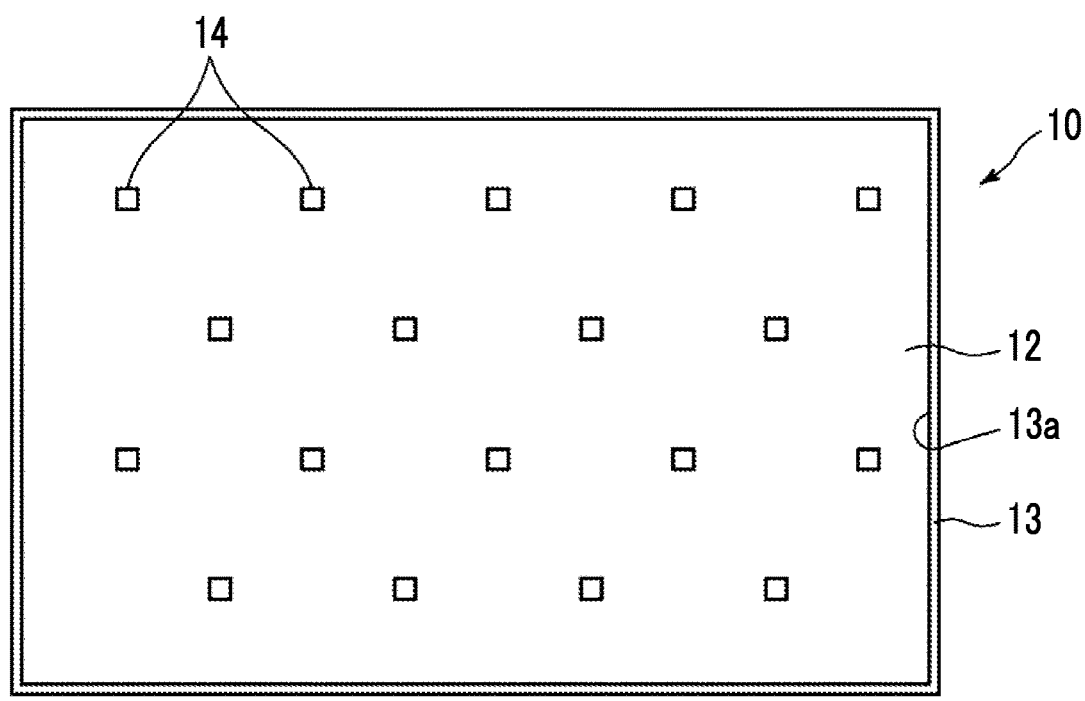
FIG. 2 is a schematic plan view illustrating a light source portion of a backlight unit.

The light source portion 10 includes a reflection plate 12 on which the point light sources 14 are aligned. FIG. 2 is a schematic plan view illustrating the light source portion 10. As illustrated in FIG. 2, the point light sources 14 are arranged in a matrix at a predetermined regular interval on the reflection plate 12. The light source portion 10 includes a side wall 13 that is provided at an edge of the reflection plate 12 and includes a reflecting surface 13a on the inside.

The point light source 14 may be a LED or may be a laser light source. The laser light source is preferable from the viewpoints that color reproducibility can be improved and light can be more efficiently spread in an in-plane direction. In addition, as the light source, a white light source may be used, or a plurality of light sources having different emission colors may be used. Further, the light source may be a monochromatic light source. In a case where the monochromatic light source is used, the backlight unit or the liquid crystal display element includes a member including a phosphor, in which white light or other desired luminescent color light can be obtained by converting the performing wavelength conversion on light emitted from the monochromatic light source using the phosphor. For example, a LED that emits blue or ultraviolet light can be used as the light source, and a quantum dot phosphor can be used as the phosphor. The number of point light sources is directly linked to the number of divided areas of local dimming. Therefore, in order to increase the number of divided areas, it is necessary to increase the number of point light sources. By using a point light source having a smaller size, the number thereof can be increased. As the point light source 14, a LED having a size of 0.15 mm or less and preferably 0.1 mm or less is preferable.

The substrate on which the point light sources 14 are arranged is not limited to the reflection plate. However, in order to increase the light use efficiency by further reflecting a light component reflected from the brightness homogenizing member 20 among light emitted from the point light sources 14 to the brightness homogenizing member 20, it is preferable that the point light sources 14 are arranged on the reflection plate 12. The reflection plate 12 is not particularly limited, and various well-known reflection plates can be used. In order to effectively utilize light, it is preferable that the reflection plate 12 includes a reflecting surface having a small absorption and a high reflectivity. For example, it is preferable that the reflection plate 12 includes a reflecting surface including a multi-layer film that is formed of a white polyethylene terephthalate (PET) or a polyester resin, but the present invention is not limited thereto. Examples of the multi-layer film formed of a polyester resin include ESR (trade name, manufactured by 3M).

In the liquid crystal display device 1, light emitted from the point light sources 14 of the backlight unit 2 is incident into the brightness homogenizing member 20 from the incidence surface 20a, and is emitted from the emission surface 20b in a state where the in-plane brightness is homogenized in the brightness homogenizing member 20. A backlight having high in-plane homogeneity emitted from the backlight unit 2 can be allowed to be incident into the liquid crystal display element 50.

Figure 3:
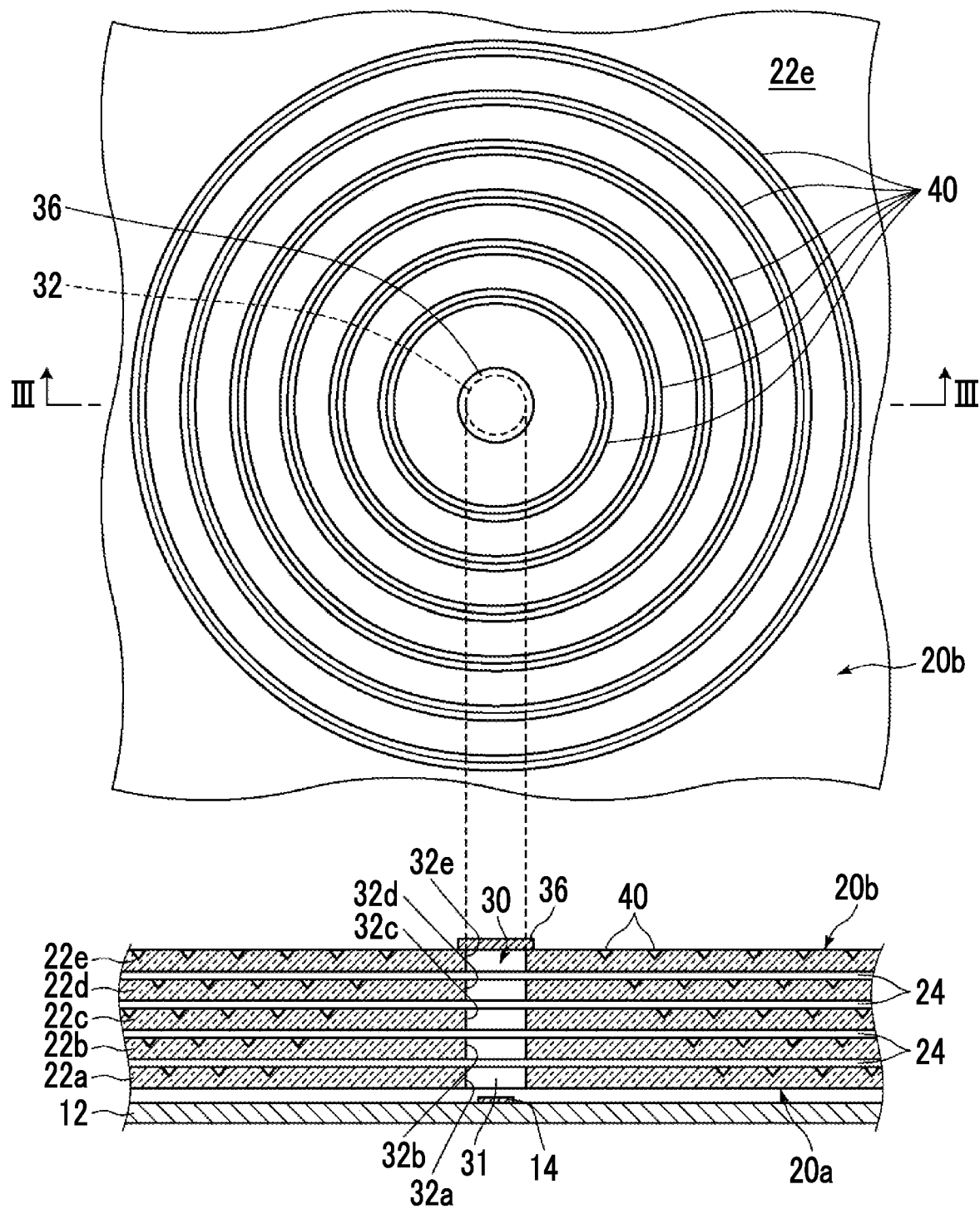
FIG. 3 are a schematic plan view and a schematic cross-sectional view illustrating a part of a brightness homogenizing member of the backlight unit.

Referring to FIGS. 1 and 3, the brightness homogenizing member 20 according to the embodiment will be described in detail. FIG. 3 are a schematic plan view (upper section) and a line schematic cross-sectional view (lower section) illustrating a part of the backlight unit 2 illustrated in FIG. 1.

The brightness homogenizing member 20 is a surface-shaped member that homogenizes the brightness of light incident into the incidence surface 20a from the light source portion 10 and emits the light having the homogeneous brightness from the emission surface 20b.

The brightness homogenizing member 20 has a laminate structure in which high refractive index layers 22 (22a, 22b, 22c, ...) having a relatively high refractive index and low refractive index layers 24 having a relatively low refractive index are alternately laminated in a direction perpendicular to the emission surface 20b. The incidence surface 20a of the brightness homogenizing member 20 is a surface, which faces the light source portion 10, of the high refractive index layer closest to the light source portion 10 side in the laminate structure in which the plurality of high refractive index layers 22 and the low refractive index layers 24 are alternately laminated. In addition, the emission surface 20b of the brightness homogenizing member 20 is a surface, which faces the liquid crystal display element 50, of the high refractive index layer closest to the liquid crystal display element 50 side in the laminate structure.

In this example, the brightness homogenizing member 20 includes five high refractive index layers 22 in the laminate structure. However, the laminate structure in which the high refractive index layers 22 and the low refractive index layers 24 are alternately laminated is not particularly limited as long as it includes at least two high refractive index layers 22. In order to realize sufficient brightness homogenization without excessively increasing the thickness of the brightness homogenizing member, the number of high refractive index layers is preferably 3 to 10.

Hereinafter, in a case where it is necessary to distinguish between the respective layers of the plurality of high refractive index layers 22, the respective layers will be referred to as "high refractive index layers 22a, 22b, 22c, and ...", and in a case where it is not necessary to distinguish between the respective layers of the plurality of high refractive index layers 22, the respective layers will be simply referred to as "high refractive index layers 22".

In order to allow a large amount of light that is incident into an interface between the high refractive index layer 22 and the low refractive index layer 24 from the high refractive index layer 22 side to be totally reflected from the interface, a difference in refractive index between the high refractive index layer 22 and the low refractive index layer 24 is preferably 0.2 or higher.

Materials for forming the high refractive index layer and the low refractive index layer are not particularly limited as long as the high refractive index layer has a higher refractive index than the low refractive index layer. As the low refractive index layer 24, an air layer is most preferable. As the high refractive index layer 22, various well-known plate-shaped materials (sheet-shaped materials) can be used. Examples of the high refractive index layer 22 include a light guide sheet that is formed of a resin having high transparency that is the same as that for forming a light guide plate used in a well-known backlight unit, for example, polyethylene terephthalate, polypropylene, polycarbonate, an acrylic resin such as polymethyl methacrylate, benzyl methacrylate, polymethacrylstyrene (MS resin), a cycloolefin polymer, a cycloolefin copolymer, or cellulose acylate such as cellulose diacetate or cellulose triacetate. The above-described resin is not limited to a thermoplastic resin and, for example, may be an ultraviolet curable resin, an ionizing radiation-curable resin such as an electron beam curable resin, or a thermosetting resin.

The thickness of one high refractive index layer 22 is preferably 2 μm to 100 μm.

The thickness of the low refractive index layer 24 (in the embodiment, the air layer 24), that is, a gap between the high refractive index layers 22 is not particularly limited as long as it is a distance with which the high refractive index layers 22 are not in contact with each other, and is preferably is more than 0 μm and 10 μm or less. In the air layer 24, a spacer (not illustrated) for maintaining the gap between the high refractive index layers 22, that is, for forming the air layer 24 is arranged. For example, by dispersing and arranging a silica sphere having a diameter of several micrometers between the high refractive index layers 22 as the spacer, the air layer 24 can be formed.

The brightness homogenizing member 20 includes a light incidence portion 30 that is provided at each of positions of the laminate structure facing the plurality of point light sources 14. The light incidence portion 30 allows light emitted from the point light source 14 to be incident into each of the high refractive index layers 22a, 22b, 22c, ... included in the laminate structure. In this case, the light incidence portion 30 allows the light to be incident into the high refractive index layers 22a, 22b, 22c, ... under a condition where the light is guided by total reflection in each of the high refractive index layers 22a, 22b, 22c, .... It is not necessary that the light incidence portion 30 allows the light to be incident into the high refractive index layers 22 under the condition where all the light components are guided by total reflection in the high refractive index layers 22. However, it is preferable that the light incidence portion 30 allows the light to be incident into the high refractive index layers 22 under the condition where a larger amount of the light is guided by total reflection in the high refractive index layers 22.

Since each of the point light sources 14 includes the light incidence portion 30, light emitted from each of the point light sources 14 in a predetermined region centering around the point light source 14 can be homogenized.

The light incidence portion 30 in the brightness homogenizing member 20 is formed of a cylindrical hollow portion 31 as a through hole that penetrates five high refractive index layers 22a to 22e. A side wall surface of the hollow portion 31 is formed of a surface (hereinafter, referred to as "side surface") that is formed in the high refractive index layer 22 and has an inclination with respect to a surface (interface with the low refractive index layer 24) of the high refractive index layer 22. In other words, the hollow portion 31 is configured to be surrounded by the side surface of the high refractive index layer, and the side wall surface of the hollow portion 31 is the same as the side surface of the high refractive index layer.

In the embodiment, the hollow portion 31 is the through hole penetrating the high refractive index layers 22a to 22e. The light incidence portion in the brightness homogenizing member is not particularly limited as long as it is a hollow portion that is provided across at least two high refractive index layers to penetrate at least one of the high refractive index layers.

The light incidence portion 30 has a function of allowing the light to be incident into the high refractive index layers by refraction or reflection from the side wall surface of the hollow portion 31. Due to the action of the light incidence portion 30, the light emitted from the point light source 14 can be spread in an in-plane direction and guided.

The through hole is provided in each of the high refractive index layers 22a to 22e, and by laminating the high refractive index layers 22a to 22e such that the through holes thereof are continuous, the hollow portion 31 formed of one through hole is configured. The light emitted from the point light sources 14 is incident into the hollow portion 31, is incident into the side wall surface of the hollow portion 31, that is, side surfaces 32a to 32e of the respective high refractive index layers 22a to 22e, and is refracted from the side surfaces 32a to 32e such that an advancing direction thereof changes. At this time, in a case where an incidence angle at which the light that is refracted from the side surface 32a to 32e and is incident into each of the high refractive index layers 22a to 22e is incident into the interface with the low refractive index layer (air layer 24) is more than or equal to a total reflection angle, the light is guided in the in-plane direction by repeated total reflection in the respective high refractive index layers 22a to 22e. On the other hand, the light incident into the above-described interface at less than the total reflection angle is emitted from the high refractive index layer 22. The light emitted from the incidence surface 20a of the brightness homogenizing member 20 is reflected from the reflection plate 12 and returns to the emission surface 20b side.

The hollow portion 31 may be filled with a low refractive index material. However, in order to allow most of the light emitted from the point light source to be incident into the high refractive index layer 22 and to be guided, it is preferable that a difference in refractive index between the low refractive index material and each of the high refractive index layers 22 is large. It is also preferable that the hollow portion 31 is a gap filled with air.

In addition, the side wall surface of the hollow portion 31 may be treated for antireflection. The antireflection treatment may include a treatment of laminating of thin layers having a specific refractive index and a specific thickness or a treatment of providing a moth-eye structure on a surface. By performing the antireflection treatment, a larger amount of light emitted from the point light sources can be allowed to be incident into the high refractive index layers 22.

The size of an opening of the hollow portion 31 is more than or equal to the size of the point light source. In a plan view, the opening can include the point light source 14.

In the embodiment, the hollow portion 31 having the same opening size is provided across all the high refractive index layers 22a to 22e. However, the opening sizes of holes provided in the respective high refractive index layers 22a to 22e are not necessarily the same.

The brightness homogenizing member 20 according to the embodiment includes a light reflection member 36 facing the opening of the hollow portion 31 at the emission surface 20b side. The light reflection member 36 suppresses the light emitted from the point light sources 14 from passing through the hollow portion 31 and being emitted from the emission surface 20b as it is. On the other hand, the light reflection member 36 allows transmission of a part of light incident from the laminate structure side such that a predetermined brightness in a region immediately above the point light source 14 can be secured.

Accordingly, the light reflection member 36 reflects 50% or higher of the light and allows transmission of at least higher than 0% of the light.

Instead of the light reflection member 36, a light absorption member may be provided. The light absorption member that absorbs 50% or higher of the light and allows transmission of at least higher than 0% of the light is used.

In addition, the high refractive index layer 22 includes a light extraction mechanism 40 that is provided at a position spaced apart from the light incidence portion 30 to allow the light guided in the high refractive index layer 22 to be emitted from the emission surface 20b side of the high refractive index layer 22.

In a case where light that is guided by repeated total reflection in the high refractive index layer 22 is incident into the light extraction mechanism 40, the light extraction mechanism 40 may be a structure that emits the light from the high refractive index layer 22 under a condition other than the total reflection condition of the light. In the embodiment, the light extraction mechanism 40 is formed of a concave portion provided on the surface of the high refractive index layer 22.

The light extraction mechanism 40 is provided in each of the high refractive index layers 22a to 22e. A plan view of FIG. 3 illustrates a part of the emission surface 20b of the brightness homogenizing member 20 that is formed of the high refractive index layer 22e arranged closest to the liquid crystal display element 50 side. In the embodiment, the light extraction mechanism 40 is an annular concave portion with a cross-section having an inverted triangular shape. In each of the high refractive index layers 22a to 22e, a plurality of annular concave portions are concentrically provided, but the number and arrangement thereof may be appropriately set.

In the embodiment, the light extraction mechanism 40 is provided at a position at which the distance from the light incidence portion 30 increases toward the high refractive index layer close to the incidence surface 20a side of the brightness homogenizing member 20 among the high refractive index layers 22a to 22e. That is, the plurality of high refractive index layers 22a to 22e included in the brightness homogenizing member 20 include a concave portion having a concentric circular shape in which a minimum radius gradually increases toward the high refractive index layer arranged close to the incidence surface 20a. With this configuration, light extraction can be performed in a state where light is further spread and guided in the in-plane direction toward the high refractive index layer close to the incidence surface 20a. Since the amount of incident light increases toward the high refractive index layer arranged close to the incidence surface 20a, the effect of brightness homogenization is high.

In the description of the embodiment, the light extraction mechanism 40 is formed of a concave portion provided as a continuous annular shape. The light extraction mechanism 40 having one annular shape may be formed of a plurality of concave portions that are discretely arranged in an annular shape. In addition, the light extraction mechanism 40 is not necessarily provided in an annular shape. The light extraction mechanism 40 may be a convex portion. In addition, the shape of the concave portion or the convex portion forming the light extraction mechanism is not particularly limited and may be a quadrangular pyramid hemispherical shape, a conical shape, a polygonal pyramid shape, a truncated cone shape, a polygonal truncated pyramid shape, or the like.

In addition, the light extraction mechanism may be a light scattering structure that is provided in the high refractive index layer or on the surface of the high refractive index layer. In a case where the high refractive index layer includes the light scattering structure, light that is input from the light incidence portion and is guided by total reflection in the high refractive index layer can be scattered by the light scattering structure and can be emitted from the high refractive index layer. The light scattering structure can be prepared, for example, by arranging light scattering particles in the high refractive index layer or on the surface of the high refractive index layer or by providing a fine uneven structure on the surface of the high refractive index layer. In addition, it is preferable that a formation density of the light scattering structure is appropriately adjusted such that a balance between the amount of light that is spread in the in-plane direction in the high refractive index layer and the amount of light that is emitted from the high refractive index layer is appropriately adjusted.

The light extraction mechanism may be randomly arranged in the high refractive index layer, may be periodically arranged in the high refractive index layer, or may be arranged in the high refractive index layer to have a distribution structure in a plane. In addition, in a case where the light extraction mechanism is provided on the surface of the high refractive index layer, the light extraction mechanism may be provided on both surfaces thereof instead of being provided on only a single surface. Further, in a case where the light extraction mechanism includes the convex portion or the fine uneven structure, the structure can function as the above-described spacer for forming the air layer 24.

The above-described brightness homogenizing member 20 includes the light incidence portion 30 such that light can be guided in the plurality of high refractive index layers 22a to 22e and can be spread in a direction away from the point light sources in the horizontal direction (in-plane direction). Therefore, brightness homogenization can be realized and light with a small brightness unevenness can be emitted. The side surfaces 32a to 32e forming the side wall surface of the hollow portion are provided in the respective high refractive index layers, and light can be allowed to be incident from the side surfaces 32a to 32e into the high refractive index layers 22a to 22e, respectively. Therefore, the light extraction efficiency is high, and the light use efficiency is excellent. In addition, by providing the plurality of high refractive index layers, a plurality of light extraction mechanisms can be provided across the entire brightness homogenizing member. Therefore, the brightness homogenization and the light use efficiency can be further improved.

The backlight unit 2 includes the above-described brightness homogenizing member 20 such that light having a homogeneous brightness can be emitted. Therefore, a thick space is unnecessary between the light source portion 10 and the brightness homogenizing member 20. Accordingly, even a direct backlight unit can be made to be significantly thinner than that of the related art.

Since the backlight unit 2 is a direct backlight mode, multi-division local dimming corresponding to the number of point light sources included in the backlight unit 2 can be realized.

In addition, since the thickness of the backlight unit 2 is reduced, the thickness of the liquid crystal display device 1 as a whole can also be reduced. Further, a backlight with sufficiently high brightness homogeneity can be emitted from the backlight unit 2. Therefore, a gap between the backlight unit 2 and the liquid crystal display element 50 can also be reduced, and the thickness of the liquid crystal display device can be further reduced.

Hereinafter, design modification examples of the brightness homogenizing member will be described with reference to FIGS. 4 to 9. FIGS. 4 to 9 are enlarged schematic diagrams illustrating a part of the brightness homogenizing member, in which a region including one point light source 14 and one light incidence portion arranged to face the point light source 14 is illustrated.

Figure 4:
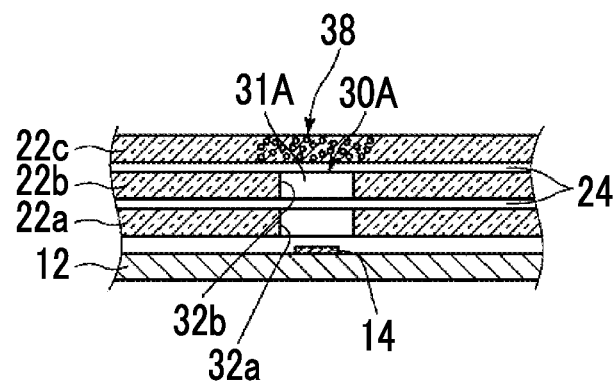
FIG. 4 is a schematic cross-sectional view illustrating a part of a design modification example 1 of the brightness homogenizing member.

FIG. 4 is a schematic cross-sectional view illustrating a light incidence portion 30A according to a design modification example 1 of the brightness homogenizing member. The brightness homogenizing member illustrated in FIG. 4 has a laminate structure in which three high refractive index layers 22a to 22c and the air layers 24 are alternately laminated. The light incidence portion 30A is formed of a hollow portion 31A that is provided to penetrate the two high refractive index layers 22a and 22b on the point light source 14 side among the three high refractive index layers 22a to 22c. A side wall surface of the hollow portion 31A is formed of side surfaces 32a and 32b of the high refractive index layers 22a and 22b.

In the brightness homogenizing member illustrated in FIG. 4, a light scattering portion 38 is provided in a region facing an opening of the hollow portion 31A of the high refractive index layer 22C arranged closest to the liquid crystal display element side, the high refractive index layer 22C forming the emission surface of the brightness homogenizing member. The light scattering portion 38 is provided in a region of the high refractive index layer 22c in which scattering particles are dispersed. The light scattering portion 38 suppresses the light emitted from the point light sources 14 from passing through the hollow portion 31A and being emitted from the emission surface 20b as it is.

In the brightness homogenizing member having the above-described configuration, most of light emitted from the point light source 14 is incident into the hollow portion 31A. The light that is incident into the hollow portion 31A and is then incident into the side wall surface (the side surfaces 32a and 32b) is refracted from the side wall surface, and is guided into the high refractive index layers 22a and 22b. As a result, light satisfying a total reflection condition is guided and spread in the in-plane direction. On the other hand, the light having passed through the hollow portion 31A is incident into the light scattering portion 38 and is scattered in the light scattering portion 38. In the light incident into the light scattering portion 38, a part thereof is emitted from the emission surface as scattered light, and another part thereof is repeatedly reflected and refracted in the brightness homogenizing member such that at least a part propagates in the high refractive index layer 22 and spreads in the in-plane direction.

The light that is guided in the in-plane direction in the high refractive index layers 22a to 22c is emitted from the high refractive index layers 22 by the light extraction mechanism (not illustrated in FIG. 4) and is finally emitted from the emission surface of the brightness homogenizing member.

Figure 5:
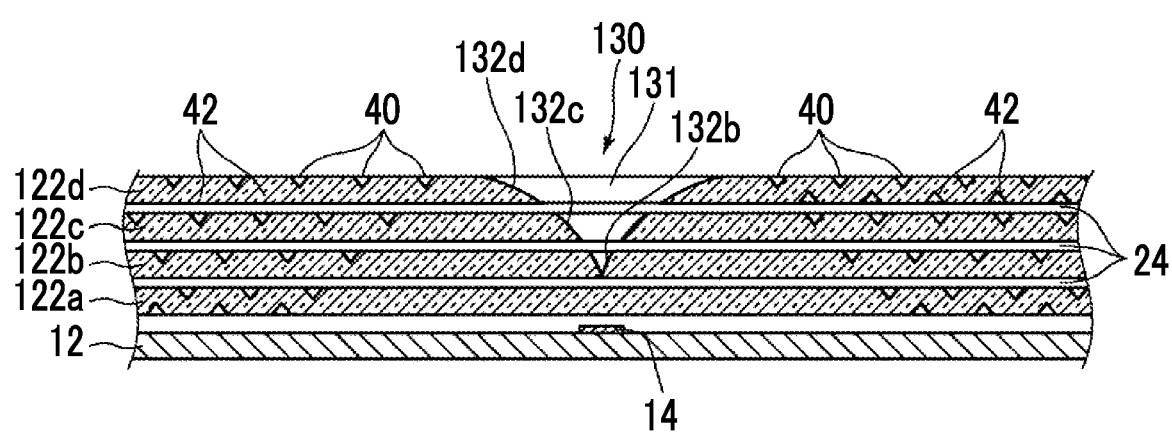
FIG. 5 is a schematic cross-sectional view illustrating a part of a design modification example 2 of the brightness homogenizing member.

FIG. 5 is a schematic cross-sectional view illustrating a design modification example 2 of the brightness homogenizing member. The brightness homogenizing member illustrated in FIG. 5 has a laminate structure in which four high refractive index layers 122a to 122c and the air layers 24 are alternately laminated. The light incidence portion 130 is formed of a hollow portion 131 that has a wide opening at the emission surface side in the laminate structure and has a shape in which a diameter decreases toward the point light source facing the hollow portion 131. In the hollow portion 131, a conical concave portion that penetrates the high refractive index layers 122d and 122c on the emission surface side and has a closed tip in the high refractive index layer 122b is provided. The side wall surface of the hollow portion 131 forming the light incidence portion 130 is formed of side surfaces 132b to 132d of the high refractive index layers 122b to 122d. The side surfaces 132b to 132d of the high refractive index layers 122b to 122d are surfaces formed by providing a conical concave portion in the hole penetrating the high refractive index layers 122c and 122d and in the high refractive index layer 122b.

In the brightness homogenizing member having the above-described configuration, the light emitted from the point light source 14 is totally reflected from the side wall surface of the hollow portion 131 (the side surfaces 132b to 132d of the high refractive index layers) and is guided into the high refractive index layers 122b to 122d. A inclination angle of the side wall surface of the hollow portion 131 (the side surfaces 132b to 132d of the high refractive index layer) with respect to an interface between the high refractive index layer and the low refractive index layer is adjusted such that light that is totally reflected from the side wall surface into the high refractive index layers is guided by repeated total reflection in the high refractive index layer. As illustrated in FIG. 5, the side wall surface of the hollow portion 131 in the embodiment is a curved surface in which the inclination angle gradually changes.

In the high refractive index layer 122a forming the incidence surface of the brightness homogenizing member illustrated in FIG. 5 and the high refractive index layer 122d of the emission surface of the brightness homogenizing member, the light extraction mechanisms 40 and 42 are provided on both surfaces on the incidence surface side and the emission surface side, respectively. By increasing the number of the light extraction mechanisms, the effect of brightness homogenization can be improved.

Figure 6:
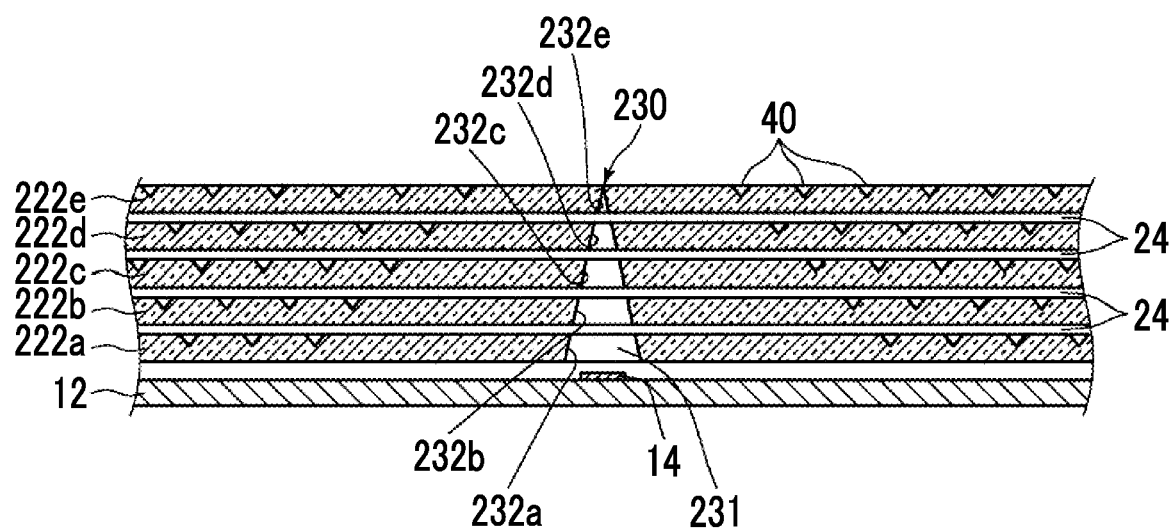
FIG. 6 is a schematic cross-sectional view illustrating a part of a design modification example 3 of the brightness homogenizing member.

FIG. 6 is a schematic cross-sectional view illustrating a design modification example 3 of the brightness homogenizing member. The brightness homogenizing member illustrated in FIG. 6 has a laminate structure in which five high refractive index layers 222a to 222e and the air layers 24 are alternately laminated. A light incidence portion 230 is a conical hollow portion 231 that is provided in the laminate structure and has an opening on the incidence surface side at a position facing the point light source 14. The hollow portion 231 penetrates the high refractive index layers 222a to 222d has a conical apex in the high refractive index layer 222e forming the emission surface of the brightness homogenizing member. The side wall surface of the hollow portion 231 is formed of side surfaces 232a to 232e of the high refractive index layers 222a to 222e. The side surfaces 232a to 232e of the high refractive index layers 222a to 222e are surfaces formed by providing a concave portion with a conical tip in the hole penetrating the high refractive index layers 222a to 222d and in the high refractive index layer 222e.

An opening of the hollow portion 231 having a conical shape corresponds to the bottom surface of the cone. The opening is arranged to face the point light source 14, and the opening size is preferably more than or equal to the size of the point light source 14.

In the brightness homogenizing member having the above-described configuration, the light emitted from the point light source 14 is incident into the side wall surface of the hollow portion 231 (the side surfaces 232a to 232e of the high refractive index layers) forming the light incidence portion 230 to be refracted and is guided into the high refractive index layers 222a to 222e. An inclination angle of the side wall surface with respect to an interface between the high refractive index layer and the low refractive index layer is adjusted such that the refracted light is guided by repeated total reflection in the high refractive index layers 222a to 222e.

Figure 7:
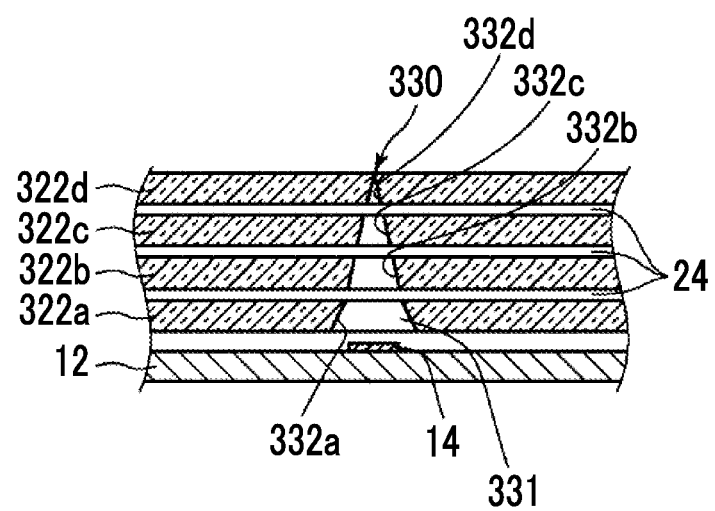
FIG. 7 is a schematic cross-sectional view illustrating a part of a design modification example 4 of the brightness homogenizing member.

FIG. 7 is a schematic cross-sectional view illustrating a design modification example 4 of the brightness homogenizing member. The brightness homogenizing member illustrated in FIG. 7 has a laminate structure in which four high refractive index layers 322a to 322d and the air layers 24 are alternately laminated. A light incidence portion 330 is formed of a partially conical hollow portion 331 that is provided in the laminate structure and has an opening on the incidence surface side at a position facing the point light source 14. The hollow portion 331 penetrates the high refractive index layers 322a to 322c has a conical apex in the high refractive index layer 322d forming the emission surface of the brightness homogenizing member. The side wall surface of the hollow portion 332 is formed of side surfaces 332a to 332d of the high refractive index layers 322a to 322d. The side surfaces 332a to 332d of the high refractive index layers 322a to 322d are surfaces formed by providing a concave portion with a conical tip in the hole penetrating the high refractive index layers 322a to 322c and in the high refractive index layer 322d. In the embodiment, regarding the inclination of the side wall surface of the hollow portion 331, the inclination in the high refractive index layer 322a arranged closest to the light source portion side is different from that in the other high refractive index layers 322b to 322d. This way, the inclination angle of the side wall surface of the hollow portion 331 may vary depending on the high refractive index layers.

Figure 8:
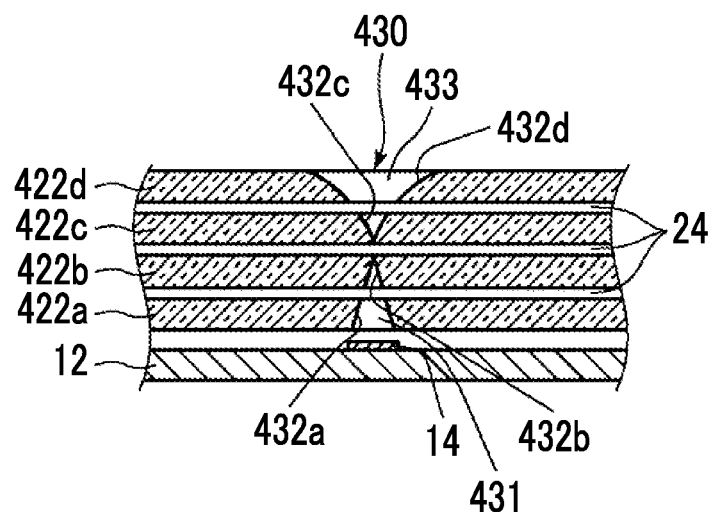
FIG. 8 is a schematic cross-sectional view illustrating a part of a design modification example 5 of the brightness homogenizing member.

FIG. 8 is a schematic cross-sectional view illustrating a design modification example 5 of the brightness homogenizing member. The brightness homogenizing member illustrated in FIG. 8 has a laminate structure in which four high refractive index layers 422a to 422d and the air layers 24 are alternately laminated. A light incidence portion 430 is formed of: a hollow portion 431 that is provided across the high refractive index layers 422a and 422b; and a hollow portion 433 that is provided across the high refractive index layers 422c and 422d. The hollow portion 431 has a conical shape that has an opening on the incidence surface side at a position facing the point light source 14, and the hollow portion 433 has a wide opening at the emission surface side and has a shape in which a diameter decreases toward the point light source 14 facing the hollow portion 433. This way, the light incidence portion 430 may be formed of a plurality of hollow portions 431 and 433.

Figure 9:
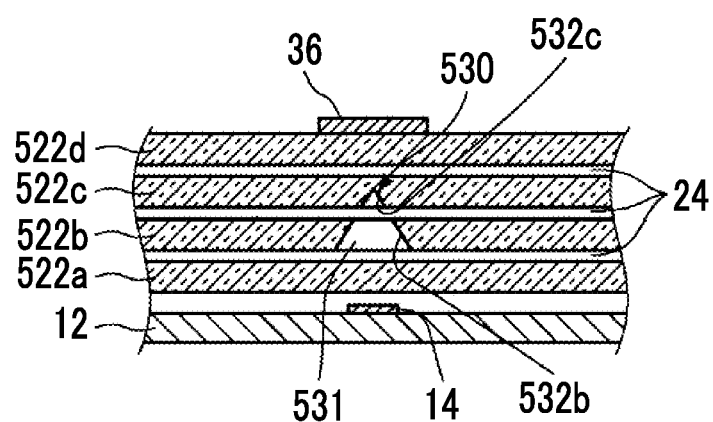
FIG. 9 is a schematic cross-sectional view illustrating a part of a design modification example 6 of the brightness homogenizing member.

FIG. 9 is a schematic cross-sectional view illustrating a design modification example 6 of the brightness homogenizing member. The brightness homogenizing member illustrated in FIG. 9 has a laminate structure in which four high refractive index layers 522a to 522d and the air layers 24 are alternately laminated. A light incidence portion 530 is formed of a partially conical hollow portion 531 that is provided across the two high refractive index layers 522b and 522c and has an opening on the incidence surface side at a position facing the point light source 14. In the embodiment, the light incidence portion 530 is provided in the high refractive index layer 522d forming the emission surface of the brightness homogenizing member and in the high refractive index layer 522a forming the incidence surface of the brightness homogenizing member. This way, the light incidence portion 530 may be provided in the laminate structure.

In the light incidence portions 330, 430, and 530 of the brightness homogenizing members according to the design modification examples 4 to 6 illustrated in FIGS. 7 to 9, light can be guided in the in-plane direction due to the same action as the light incidence portions of the brightness homogenizing members according to the above-described design modification examples 1 to 3.

In a case where the brightness homogenizing member according to any one of the design modification examples described above with reference to FIGS. 4 to 9 is provided, the same effects as those in a case where the brightness homogenizing member 20 described above with reference to FIG. 3 is provided can be obtained.

The brightness homogenizing member including the through hole that penetrates all the high refractive index layers as illustrated in FIG. 1 can be prepared using a method including: forming the through hole by mechanical cutting or laser irradiation in a state where a plurality of light guide sheets forming the high refractive index layers are laminated; and providing the air layer between the respective light guide sheets.

The brightness homogenizing member including the light incidence portion that is formed of the hollow portion having a complex shape as illustrated in FIGS. 4 to 9 can be prepared, for example, using a method including: preparing a mold for each of the high refractive index layers; preparing a plurality of light guide sheets having different concave portions or holes by imprinting using the molds; and providing the air layer between the respective light guide sheets.

The light extraction mechanism may also be formed by imprinting. The light extraction mechanism may be prepared by providing various scratches to the surface.

A hole or a concave portion that is provided in the high refractive index layer forming the hollow portion included in the laminate structure may be filled with a low refractive index material.

The planar lighting device according to the present disclosure can be also used not only as the backlight unit in the above-described liquid crystal display device but also as a backlight unit of a signboard, a sign, or the like or an interior lamp or the like.

The disclosure of Japanese Patent Application No. 2017-206038 filed on Oct. 25, 2017 is incorporated herein in its entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. A planar lighting device comprising:
   a light source portion including a plurality of point light sources that are two-dimensionally arranged; and
   a brightness homogenizing member that homogenizes a brightness of light emitted from the light source portion and emits light having homogeneous brightness, the brightness homogenizing member including an incidence surface at which light from the light source portion is incident and an emission surface at an opposite side of the brightness homogenizing member from the incidence surface, that emits light, wherein:
   the brightness homogenizing member has a laminate structure in which high refractive index layers having a relatively high refractive index and low refractive index layers having a relatively low refractive index are alternately laminated in a direction perpendicular to the emission surface and the number of the high refractive index layers is two or more,
   a light incidence portion, which allows light emitted from each of the plurality of point light sources to be incident at the high refractive index layers included in the laminate structure, is provided at a position in the laminate structure facing the point light sources, the light being incident into the high refractive index layers under a condition such that the light is guided by total reflection in the high refractive index layers,
   the light incidence portion is formed of a hollow portion that is provided across the two or more high refractive index layers included in the laminate structure to penetrate at least one high refractive index layer and has a function of allowing the light to be incident at the high refractive index layers by refraction or reflection from a side wall surface of the hollow portion, and
   each of the high refractive index layers includes a light extraction mechanism that is provided at a position spaced apart from the light incidence portion to allow the light guided in the high refractive index layers to be emitted to the emission surface side.

2. The planar lighting device according to claim 1, wherein the hollow portion has a wide opening at an emission surface side thereof and has a shape in which a diameter decreases toward the point light source facing the hollow portion.

3. The planar lighting device according to claim 1, wherein the hollow portion has a conical shape having an opening at an incidence surface side thereof at a position facing the point light source.

4. The planar lighting device according to claim 1,
wherein the hollow portion has a cylindrical shape having an opening that faces the point light source facing the hollow portion.

5. The planar lighting device according to claim 1, further comprising:
a light reflection member or a light absorption member that is provided at a position of the laminate structure facing the point light source with the hollow portion interposed between the laminate structure and the point light source.

6. The planar lighting device according to claim 1,
wherein a distance of the light extraction mechanism included in each of the high refractive index layers from the light incidence portion increases toward the high refractive index layer closest to the incidence surface side.

7. The planar lighting device according to claim 1,
wherein the light extraction mechanism is provided in an annular shape centering on the light incidence portion.

8. The planar lighting device according to claim 1,
wherein the low refractive index layer is an air layer.

9. A liquid crystal display device comprising:
a liquid crystal display element; and
the planar lighting device according to claim 1.

* * * * *